United States Patent [19]

Amil et al.

[11] Patent Number: 5,280,889
[45] Date of Patent: Jan. 25, 1994

[54] SHOCK ISOLATOR

[75] Inventors: David L. Amil, Grand Prairie; William D. Bracken, Rockwall; Robert W. Coburn, Plano; Richard L. Knipe, McKinney; Gregory G. Mooty, Dallas; David D. Ratcliff, Richardson; Daniel W. Stanley, Desoto; Kenneth L. Taylor, Rowlett, all of Tex.; Steven S. Stresau, Palm Bay

[73] Assignee: Texas Instruments Incorporated, Dallas, Tex.

[21] Appl. No.: 681,821

[22] Filed: Apr. 8, 1991

[51] Int. Cl.⁵ .............. F16F 1/22; F16F 1/34; F16F 1/44
[52] U.S. Cl. .................. 267/160; 248/618; 248/638; 267/136; 267/140.5; 267/163
[58] Field of Search ............ 267/158, 160, 161, 163, 267/165, 136, 137, 140.3, 140.4, 140.5, 153; 248/618, 630, 638

[56] References Cited

U.S. PATENT DOCUMENTS

| | | | |
|---|---|---|---|
| 2,772,086 | 11/1956 | Foster | 267/158 |
| 2,960,301 | 11/1960 | Roman | 267/158 X |
| 3,737,155 | 6/1973 | Karlan | 267/165 X |
| 4,086,970 | 5/1978 | Kato | 267/168 X |
| 4,235,427 | 11/1980 | Bialobrzeski | 267/153 |

FOREIGN PATENT DOCUMENTS

| | | | |
|---|---|---|---|
| 8604124 | 7/1986 | PCT Int'l Appl. | 267/153 |
| 2197424 | 5/1988 | United Kingdom | 267/165 |

Primary Examiner—George A. Halvosa
Attorney, Agent, or Firm—Rene' E. Grossman; Richard L. Donaldson

[57] ABSTRACT

"A vehicle and the ballistic shock isolator therefor including a turret, a sensor assembly and a shock isolator isolating the turret from the sensor switch and including upper and lower annular members, a plurality of leaves secured at opposing ends thereof to the annular members, each of the leaves having a corrugated bellows shaped portion in the form of an even number of similarly shaped portions, alternate ones of the similarly shaped portions having an open end in opposing directions, each of the leaves varying in thickness and width in a direction from the upper annular member to the lower annular member. The variation in width of the portion is alternately from wide to narrow and then from narrow to wide in a direction from the upper annular member to the lower annular member. Each of the leaves is composed of a metal having a yield strength which will not be exceeded by the maximum contemplated shock conditions and at least 150 KSI, the metal returning to its original shape after being subjected to shock. The metal is preferably 4000 series stainless steel. By use of the above described ballistic shock isolator, a tank may be subjected to a severe shock due to collision with a non-penetrating projectile with the CITV sensor assembly being capable of rapid repositioning to substantially identically return to its original position relative to the tank, thereby providing reliable boresight for use in connection with further tank deployment.

32 Claims, 5 Drawing Sheets

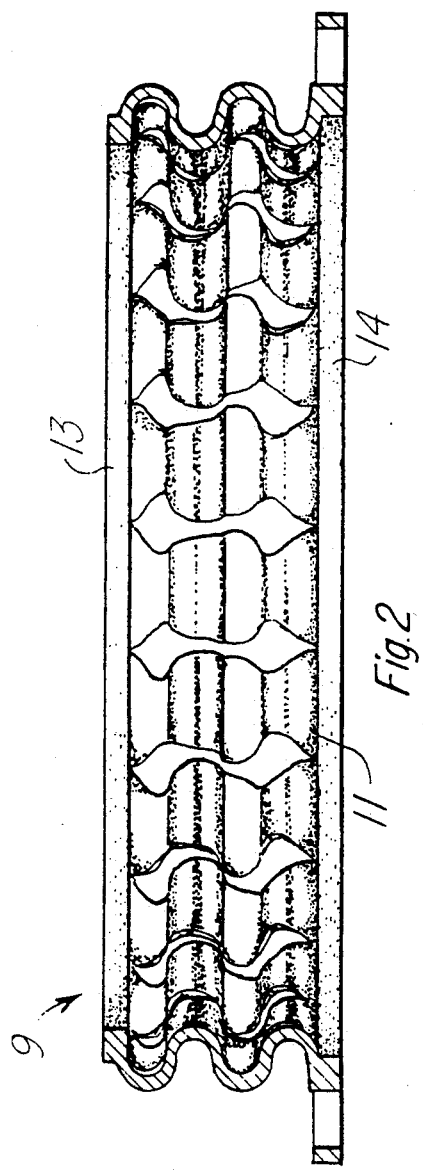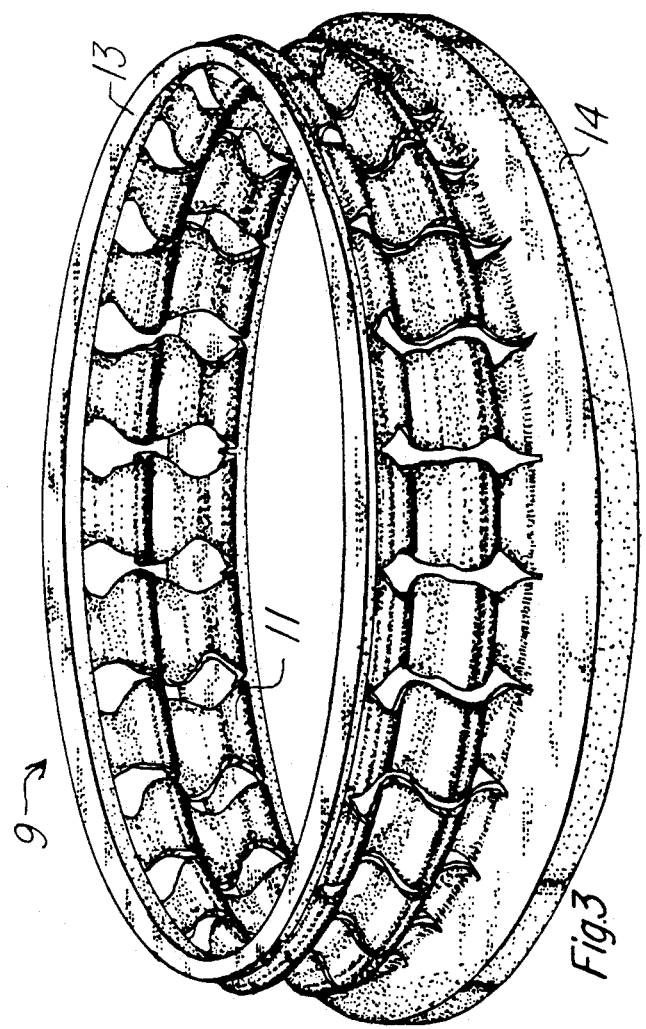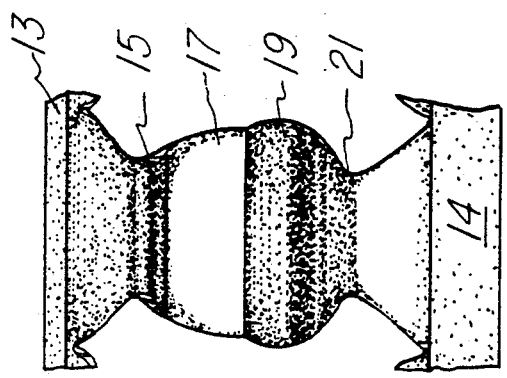

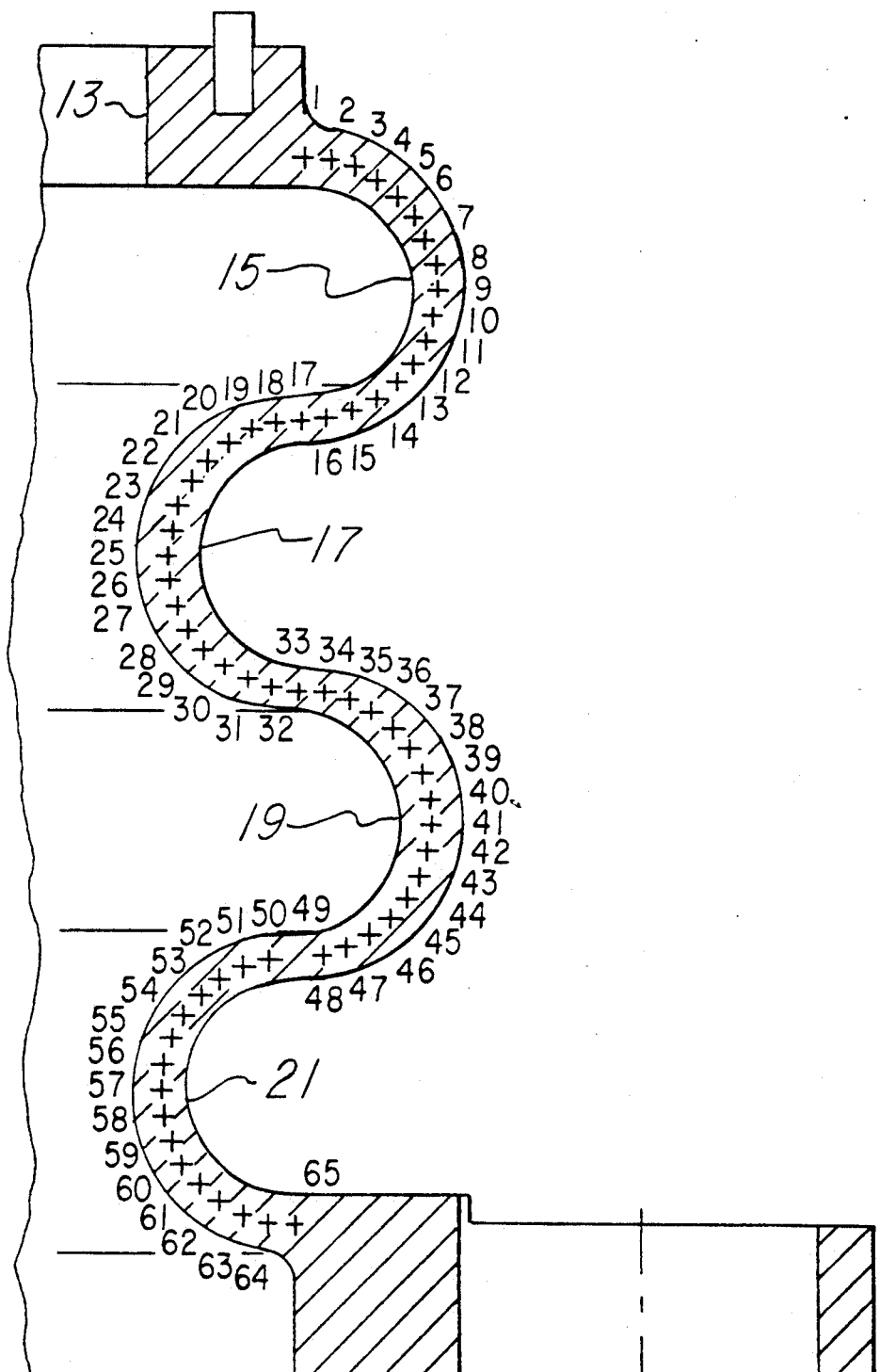

TABLE I

| \_\_\_\_ ISOLATOR SECTION DEFINITION \_\_\_\_ | | |
|---|---|---|
| POINT | "T" THICKNESS ±.010 | "W" SLOT WIDTH ±.020 |
| 1 | 0.180 | — |
| 2 | 0.180 | — |
| 3 | 0.175 | — |
| 4 | 0.170 | — |
| 5 | 0.165 | — |
| 6 | 0.160 | 0.280 |
| 7 | 0.160 | 0.380 |
| 8 | 0.160 | 0.540 |
| 9 | 0.160 | 0.700 |
| 10 | 0.160 | 0.840 |
| 11 | 0.155 | 0.980 |
| 12 | 0.150 | 1.030 |
| 13 | 0.145 | 1.080 |
| 14 | 0.140 | 1.060 |
| 15 | 0.140 | 1.040 |
| 16 | 0.140 | 0.970 |
| 17 | 0.140 | 0.900 |
| 18 | 0.140 | 0.850 |
| 19 | 0.155 | 0.800 |
| 20 | 0.170 | 0.680 |
| 21 | 0.175 | 0.570 |
| 22 | 0.180 | 0.480 |
| 23 | 0.185 | 0.390 |
| 24 | 0.190 | 0.330 |
| 25 | 0.190 | 0.280 |
| 26 | 0.190 | 0.260 |
| 27 | 0.185 | 0.240 |
| 28 | 0.180 | 0.230 |
| 29 | 0.175 | 0.220 |
| 30 | 0.170 | 0.240 |
| 31 | 0.145 | 0.250 |
| 32 | 0.120 | 0.260 |
| 33 | 0.120 | 0.280 |
| 34 | 0.120 | 0.270 |
| 35 | 0.145 | 0.260 |
| 36 | 0.170 | 0.250 |
| 37 | 0.175 | 0.240 |
| 38 | 0.180 | 0.250 |
| 39 | 0.185 | 0.260 |
| 40 | 0.190 | 0.280 |
| 41 | 0.190 | 0.310 |
| 42 | 0.190 | 0.370 |
| 43 | 0.185 | 0.430 |
| 44 | 0.180 | 0.520 |
| 45 | 0.175 | 0.610 |
| 46 | 0.170 | 0.720 |
| 47 | 0.155 | 0.830 |
| 48 | 0.140 | 0.870 |
| 49 | 0.140 | 0.900 |
| 50 | 0.140 | 0.940 |

Fig.6a

TABLE I CONTINUED

| ISOLATOR SECTION DEFINITION | | |
|---|---|---|
| POINT | "T" THICKNESS ±.010 | "W" SLOT WIDTH ±.020 |
| 51 | 0.140 | 0.990 |
| 52 | 0.140 | 1.000 |
| 53 | 0.145 | 1.010 |
| 54 | 0.150 | 0.950 |
| 55 | 0.155 | 0.890 |
| 56 | 0.160 | 0.760 |
| 57 | 0.160 | 0.630 |
| 58 | 0.160 | 0.490 |
| 59 | 0.160 | 0.340 |
| 60 | 0.160 | 0.260 |
| 61 | 0.165 | — |
| 62 | 0.170 | — |
| 63 | 0.175 | — |
| 64 | 0.180 | — |
| 65 | 0.180 | — |

*Fig.6b*

SHOCK ISOLATOR

BACKGROUND OF THE INVENTION

1. Field of the Invention

This invention relates to a shock isolator for isolating a device from surrounding shock in general and, more specifically, to a shock isolator for maintaining the integrity of boresight of a viewer for a tank and the like after the tank has been subjected to a severe shock by isolation of the viewer from the sources of adjacent shock waves.

2. Brief Description of the Prior Art

The Commander's Independent Thermal Viewer (CITV) used in a tank is required to survive the ballistic shock resulting from a non-penetrating round striking the tank turret, such survival being defined as retention of boresight after the shock as well as meeting stringent line-of-sight (LOS) jitter requirements before and after the ballistic shock. This requires that the viewer return almost identically to its original position shortly after the shock and that the isolator have a memory whereby the original position and shape thereof can be rapidly restored.

State of the art design techniques and hardware can satisfy either the survival or the boresight retention requirements or the LOS jitter requirements for a thermal viewer, however the prior art has been incapable of satisfying all three requirements simultaneously with sufficient precision whereby the equipment continues to operate under the required survival, boresight retention and LOS jitter specifications.

In the past and with past requirements, the designs of forward looking infrared (FLIR) sights have been capable of meeting their stabilization requirements in their operational vibration environments and to survive the shock levels (handling, gunfire, etc.) encountered during their usage with state of the art technology. Typically, the structurally induced LOS jitter of a thermal viewer is reduced to acceptable levels by stiffening the FLIR structure, including its mounting structure, so that the vibration environment produces little structural flexure. Depending upon the shock, devices can be protected in one of two ways.

One approach is to stiffen the device structure enough to eliminate any amplification of the shock by the structure. This approach is not feasible for CITV because the high frequency content of the ballistic shock would severely damage the sight assembly.

Another approach to protect a device from shock is to isolate it with an elastomeric or wire rope structure possessing resonant frequencies lower than the resonant frequencies of the device itself. These types of isolators typically have resonant frequencies in the 15 to 30 Hz range. Large sways are associated with shock isolated devices, however such sways are not acceptable for devices requiring precise alignment. For optical devices that require precise alignment and boresight retention, this type of isolation is unacceptable. Typically, FLIR devices involved in targeting systems are not shock mounted for this reason. However, the specifications for stabilized electro optical sights, such as CITVs, are continually being made more stringent and have now reached the point wherein the prior art techniques are presently incapable of providing the required specifications.

SUMMARY OF THE INVENTION

In accordance with the present invention, there is provided a shock isolator which advances the state of the art in electro-optic equipment shock survival, boresight retention and LOS jitter minimization in that the geometry, material and carefully tuned dynamic characteristics enable the CITV for the first time to concurrently satisfy all three of the requirements enumerated above.

In order to meet the new and more stringent image stabilization and ballistic shock protection requirements for CITVs, shock mounts for the CITV have been designed having frequencies sufficiently low to attenuate the ballistic shock, but high enough to avoid adverse effects on the stabilization performance. This is accomplished using metal for the isolator material, as opposed to an elastomer, to minimize hysteresis and prevent boresight shift. As an additional design constraint, the stresses in the isolator are below the material yield strength for the expected maximum shock in order to retain boresight after the shock. The isolator must fit the existing bolt pattern on the tank turret and must fit within a narrow available space. Finally, cost is relatively low and reproducibility does not present a problem.

The isolator should attenuate base motion induced shock/vibration energy above about 150 Hz and should operate at a frequency sufficient to provide acceptable LOS filter performance while attenuating the severe shock energies, generally but not limited to from about 60 to about 100 Hz and preferably at about 100 Hz. In order to achieve proper operation of the type required as discussed above, there is provided a circular slotted bellows/tapered leaf design composed of plural interconnected identical leaves, the leaves being interconnected at the top and bottom portions thereof with the center portions of the leaves separated from each other. Each leaf is made of 4000 series steel such as, for example 4030 steel or 17-4 steel hardened to about H925 or a material having similar properties which is a high strength castable material, about 100 to about 150 KSI and preferably 150 KSI. The shape of each leaf of the isolator, in particular when used in conjunction with an M1 tank, is as set forth in FIG. 5 wherein the width and thickness of each leaf both vary in a direction from top to bottom substantially in accordance with the Table set forth in FIG. 6 to produce the desired frequencies and to minimize stresses near the yield stress of the high strength castable material.

The use of a relatively high frequency elastic isolator as defined above, such as that of the subject disclosure, to protect electro-optics against ballistic shocks now appears to be a requirement in future military equipment since such equipment is likely to be subjected to large shocks such as the CITV ballistic shock. The shock isolator as set forth herein provides the required protection of the electro-optics which is unavailable from prior art systems.

BRIEF DESCRIPTION OF THE DRAWINGS

FIG. 2 is a side view of the plural leaved ballistic shock isolator in accordance with the present invention;

FIG. 3 is a perspective view of the plural leaved ballistic shock isolator in accordance with the present invention;

FIG. 4 is a front view of a single leaf of the ballistic shock isolator of FIGS. 2 and 3;

FIG. 5 is a side view of a single leaf of the ballistic shock isolator of FIGS. 2 and 3; and FIG. 6a and FIG. 6b show a Table setting forth horizontal width and thickness of the leaf of FIG. 5 at various locations of the leaf of FIG. 5.

DESCRIPTION OF THE PREFERRED EMBODIMENT

Figure 1:
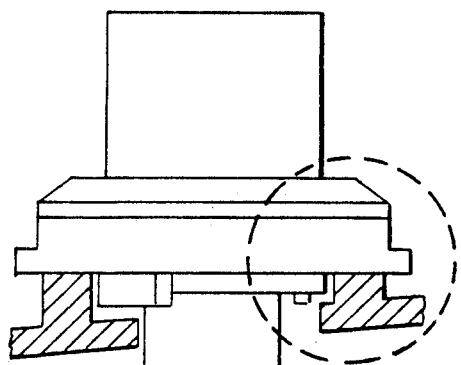
FIG. 1 is a schematic diagram of a tank turret and CITV sensor assembly showing the ballistic shock isolator in accordance with the present invention in operating position.
Figure 1A:
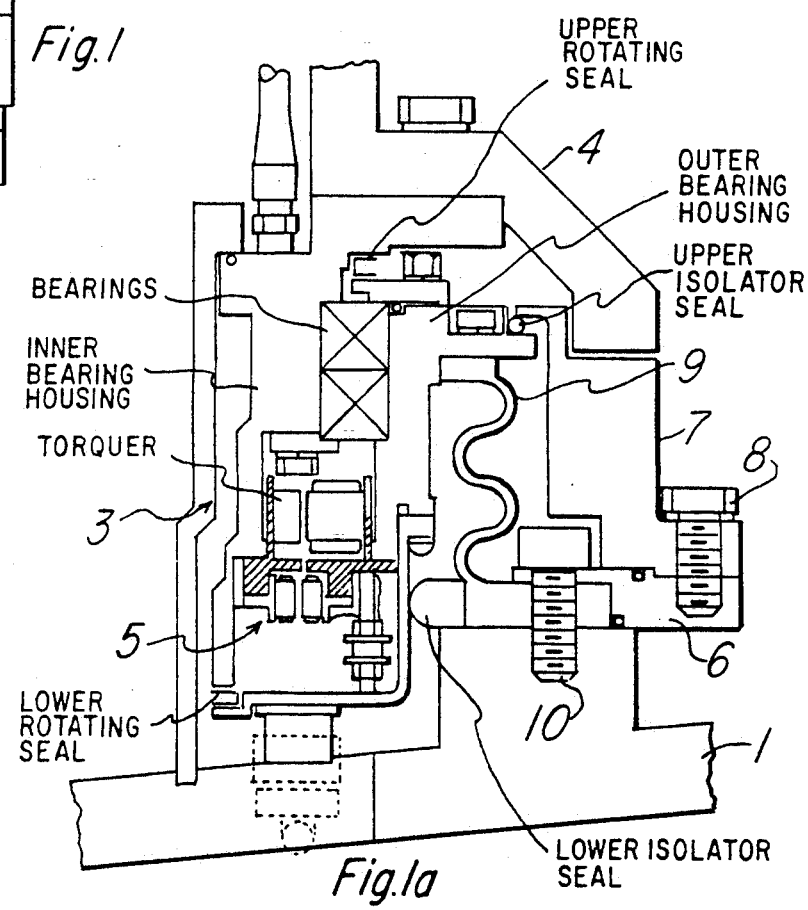
FIG. 1a is an exploded view of the portion of FIG. 1 included within the dotted circular area.

Referring first to FIGS. 1 and 1a there is shown a portion of the tank turret 1 of a tank having a CITV sensor assembly 3 which extends through the top of the tank turret. The sensor assembly 3 is coupled to an azimuth drive assembly 5 which rotates the sensor assembly about the sensor assembly axis. The azimuth drive assembly 5 is coupled to or interfaces with the tank turret 1 by means of a ballistic shock isolator 9 which will be discussed in more detail hereinbelow and which is bolted to the tank turret with the bolts 10. Stationary armor 7 which is also bolted to the armor interface 6 and tank turret with the bolts 8 protects the azimuth drive assembly 5 and the shock isolator 9 from projectiles which may strike the tank exterior. Upper rotating armor 4 sits over the shock isolator system and provides the remainder of an envelope for the shock isolator to also protect the shock isolator. All of the structure shown in FIGS. 1 and 1a with the exception of the specific ballistic shock isolator 9 is well known and part of the prior art. Accordingly, the prior art will not be discussed herein in detail.

Referring now to FIGS. 2 and 3, there is shown a ballistic shock isolator 9 in accordance with the present. The isolator includes a plurality of identical leaves 11 arranged in a circle. The leaves are secured to each other by a pair of annular rings 13 and 14, the annular ring 13 secured to and integral with the top portion of each of the leaves 11 and the annular ring 14 secured to and integral with the bottom portion of each of the leaves 11. Each leaf 11, as shown in FIGS. 2 to 5, is undulating or bellows shaped with each undulation 15, 17, 19 and 21 having a semicircular cross section. There can be some curvature at the interior of the undulations to provide curved inner surface to the isolator. Adjacent undulations 15-17, 17-19 and 19-21 extend in opposite direction with the radii of each of the undulations being substantially the same. The widths of various portions of the undulating regions 15, 17, 19 and 21 in a direction from ring 13 to ring 14 vary as set forth in FIG. 4 and the Table in FIG. 6 whereas the thickness of each leaf varies in a direction from ring 13 to ring 14 as set forth in FIG. 5, also in accordance with the Table in FIG. 6.

By means of the above described ballistic shock isolator, a tank may be subjected to a severe shock due to collision with a non-penetrating projectile with the CITV sensor assembly being capable of rapid repositioning to substantially identically its original position relative to the tank, thereby providing reliable boresight for use in connection with further tank deployment.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A shock isolator comprising:
   (a) upper and lower annular members;
   (b) a plurality of monolithic leaves secured at opposing ends thereof to said upper and lower annular members;
   (c) each of said monolithic leaves having:
      (i) a corrugated bellows shaped in the form of plural similarly shaped portions, alternate ones of said similarly shaped portions having an open end in opposing directions;
      (ii) each of said leaves varying in thickness in a direction from said upper annular member to said lower annular member; and
      (iii) each of said leaves varying in width in a direction from said upper annular member to said lower annular member.

2. A shock isolator as set forth in claim 1 further including an even number of said similarly shaped portions.

3. A shock isolator as set forth in claim 1 wherein said variation in width of said portion is alternately from wide to narrow and then from narrow to wide in a direction from said upper annular member to said lower annular member.

4. A shock isolator as set forth in claim 2 wherein said variation in width of said portion is alternately from wide to narrow and then from narrow to wide in a direction from said upper annular member to said lower annular member.

5. A shock isolator as set forth in claim 1 wherein each of said leaves is composed of a metal having a yield strength which will not be exceeded by the maximum contemplated shock conditions and at least 150 KSI, said metal returning to its original shape after being subjected to said shock.

6. A shock isolator as set forth in claim 2 wherein each of said leaves is composed of a metal having a yield strength which will not be exceeded by the maximum contemplated shock conditions and at least 150 KSI, said metal returning to its original shape after being subjected to said shock.

7. A shock isolator as set forth in claim 3 wherein each of said leaves is composed of a metal having a yield strength which will not be exceeded by the maximum contemplated shock conditions and at least 150 KSI, said metal returning to its original shape after being subjected to said shock.

8. A shock isolator as set forth in claim 4 wherein each of said leaves is composed of a metal having a yield strength which will not be exceeded by the maximum contemplated shock conditions and at least 150 KSI, said metal returning to its original shape after being subjected to said shock.

9. A shock isolator as set forth in claim 1 wherein each of said leaves is composed of a metal taken from the class consisting of hardened 4000 series and 17-4 stainless steel.

10. A shock isolator as set forth in claim 2 wherein each of said leaves is composed of a metal taken from the class consisting of hardened 4000 series and 17-4 stainless steel.

11. A shock isolator as set forth in claim 3 wherein each of said leaves is composed of a metal taken from the class consisting of hardened 4000 series and 17-4 stainless steel.

12. A shock isolator as set forth in claim 4 wherein each of said leaves is composed of a metal taken from the class consisting of hardened 4000 series and 17-4 stainless steel.

13. A shock isolator as set forth in claim 5 wherein said metal is taken from the class consisting of hardened 4000 series and 17-4 stainless steel.

14. A shock isolator as set forth in claim 6 wherein said metal is taken from the class consisting of hardened 4000 series and 17-4 stainless steel.

15. A shock isolator as set forth in claim 7 wherein said metal is taken from the class consisting of hardened 4000 series and 17-4 stainless steel.

16. A shock isolator as set forth in claim 8 wherein said metal is taken from the class consisting of hardened 4000 series and 17-4 stainless steel.

17. A vehicle which comprises:
(A) a turret;
(B) a sensor assembly; and
(C) a shock isolator isolating said turret from said sensor assembly, said shock isolator including:
  (i) upper and lower annular members;
  (ii) a plurality of monolithic leaves secured at opposing ends thereof to said upper and lower annular members;
  (iii) each of said monolithic leaves having:
    (a) a corrugated bellows shaped in the form of plural similarly shaped portions, alternate ones of said similarly shaped portions having an open end in opposing directions;
    (b) each of said leaves varying in thickness in a direction from said upper annular member to said lower annular member; and
    (c) each of said leaves varying in width in a direction from said upper annular member to said lower annular member.

18. A vehicle as set forth in claim 17 further including an even number of said similarly shaped portions.

19. A vehicle as set forth in claim 17 wherein said variation in width of said portion is alternately from wide to narrow and then from narrow to wide in a direction from said upper annular member to said lower annular member.

20. A vehicle as set forth in claim 18 wherein said variation in width of said portion is alternately from wide to narrow and then from narrow to wide in a direction from said upper annular member to said lower annular member.

21. A vehicle as set forth in claim 17 wherein each of said leaves is composed of a metal having a yield strength which will not be exceeded by the maximum contemplated shock conditions and at least 150 KSI, said metal returning to its original shape after being subjected to said shock.

22. A vehicle as set forth in claim 18 wherein each of said leaves is composed of a metal having a yield strength which will not be exceeded by the maximum contemplated shock conditions and at least 150 KSI, said metal returning to its original shape after being subjected to said shock.

23. A vehicle as set forth in claim 19 wherein each of said leaves is composed of a metal having a yield strength which will not be exceeded by the maximum contemplated shock conditions and at least 150 KSI, said metal returning to its original shape after being subjected to said shock.

24. A vehicle as set forth in claim 20 wherein each of said leaves is composed of a metal having a yield strength which will not be exceeded by the maximum contemplated shock conditions and at least 150 KSI, said metal returning to its original shape after being subjected to said shock.

25. A vehicle as set forth in claim 17 wherein each of said leaves is composed of a metal taken from the class consisting of hardened 4000 series and 17-4 stainless steel.

26. A vehicle as set forth in claim 18 wherein each of said leaves is composed of a metal taken from the class consisting of hardened 4000 series and 17-4 stainless steel.

27. A vehicle as set forth in claim 19 wherein each of said leaves is composed of a metal taken from the class consisting of hardened 4000 series and 17-4 stainless steel.

28. A vehicle as set forth in claim 20 wherein each of said leaves is composed of a metal taken from the class consisting of hardened 4000 series and 17-4 stainless steel.

29. A vehicle as set forth in claim 21 wherein said metal is taken from the class consisting of hardened 4000 series and 17-4 stainless steel.

30. A vehicle as set forth in claim 22 wherein said metal is taken from the class consisting of hardened 4000 series and 17-4 stainless steel.

31. A vehicle as set forth in claim 23 wherein said metal is taken from the class consisting of hardened 4000 series and 17-4 stainless steel.

32. A vehicle as set forth in claim 24 wherein said metal is taken from the class consisting of hardened 4000 series and 17-4 stainless steel.

* * * * *